(12) United States Patent
Jensen et al.

(10) Patent No.: US 9,996,321 B2
(45) Date of Patent: Jun. 12, 2018

(54) MULTI-TENANT, TENANT-SPECIFIC APPLICATIONS

(71) Applicant: Microsoft Technology Licensing, LLC, Redmond, WA (US)

(72) Inventors: Morten Jensen, Copenhagen (DK); Thomas Hejlsberg, Horsholm (DK); Michael Steven Hammond, Moorhead, MN (US); Christopher Michael Rudolph, Rapid City, SD (US); Kevin Martin Racer, Osage, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 14/747,527

(22) Filed: Jun. 23, 2015

(65) Prior Publication Data
US 2016/0378436 A1    Dec. 29, 2016

(51) Int. Cl.
G06F 8/20 (2018.01)
G06F 8/70 (2018.01)
G06F 9/44 (2018.01)
G06F 9/445 (2018.01)

(52) U.S. Cl.
CPC .............. *G06F 8/20* (2013.01); *G06F 8/70* (2013.01); *G06F 9/44505* (2013.01); *G06F 8/60* (2013.01)

(58) Field of Classification Search
CPC ..... G06F 8/20; G06F 8/60; G06F 8/70; G06F 9/44505
See application file for complete search history.

(56) References Cited

U.S. PATENT DOCUMENTS

| | | | |
|---|---|---|---|
| 7,546,314 B1* | 6/2009 | Lakner | G06F 8/67 |
| 8,356,274 B2 | 1/2013 | Kwok et al. | |
| 8,560,938 B2 | 10/2013 | Barrow et al. | |
| 9,021,435 B2 | 4/2015 | Pletter et al. | |
| 9,405,532 B1* | 8/2016 | Sullivan | G06F 8/71 |
| 9,778,915 B2* | 10/2017 | Shukla | G06F 8/20 |
| 9,870,238 B2* | 1/2018 | Astete | G06F 9/455 |
| 2009/0049056 A1* | 2/2009 | Shutt | G06F 17/30575 |
| 2010/0023937 A1* | 1/2010 | Kothari | G06F 9/44505 717/170 |

(Continued)

OTHER PUBLICATIONS

Sajjanlal et al., "Group Tenant based SaaS Application," 2014, IEEE, 2014 International Conference on Computer and Communication Technology (ICCCT), pp. 105-110, downloaded from the Internet at <url>:http://ieeexplore.ieee.org/ on Mar. 31, 2017.*

(Continued)

*Primary Examiner* — Thuy Dao
*Assistant Examiner* — Stephen Berman
(74) *Attorney, Agent, or Firm* — Christopher J. Volkmann; Kelly, Holt & Christenson, PLLC

(57) ABSTRACT

Customizations, made at various levels in the customization channel, are saved as separate sets of customization deltas that are applied to a base computing system in order to generate a given solution. In a multi-tenant environment, groups of tenants access different solutions or customization deltas. The tenants are automatically grouped, based upon the solution or customization deltas that they access, and the deltas for those customizations are applied to the base system at runtime, for each group.

19 Claims, 9 Drawing Sheets

(56) References Cited

U.S. PATENT DOCUMENTS

| | | | |
|---|---|---|---|
| 2010/0211548 A1* | 8/2010 | Ott | G06F 17/30575 707/655 |
| 2012/0030192 A1* | 2/2012 | An | G06F 17/30587 707/717 |
| 2012/0054720 A1 | 3/2012 | Klein et al. | |
| 2012/0072716 A1* | 3/2012 | Hu | G06F 21/602 713/156 |
| 2013/0318492 A1* | 11/2013 | Satyanarayanan | G06F 8/70 717/104 |
| 2014/0040861 A1 | 2/2014 | Kim et al. | |
| 2014/0101528 A1* | 4/2014 | Pelleg | G06F 8/38 715/234 |
| 2014/0108774 A1* | 4/2014 | Bennah | G06F 8/60 713/2 |
| 2014/0215430 A1* | 7/2014 | Abrahams | G06F 8/20 717/104 |
| 2014/0250428 A1* | 9/2014 | Marks | G06F 8/70 717/126 |
| 2014/0289391 A1 | 9/2014 | Balaji et al. | |
| 2015/0033365 A1 | 1/2015 | Mellor et al. | |
| 2015/0113499 A1* | 4/2015 | Sharma | G06F 8/20 717/104 |
| 2016/0094647 A1* | 3/2016 | Mordani | H04L 47/70 709/226 |
| 2016/0350098 A1* | 12/2016 | Kuchibhotla | G06F 8/65 |

OTHER PUBLICATIONS

Tsai et al., "SaaS Multi-tenant Application Customization," 2013, IEEE 7th International Symposium on Service Oriented System Engineering (SOSE), pp. 1-12.*
Koziolek, "The SPOSAD Architectural Style for Multi-tenant Software Applications," 2011, 9th Working IEEE/IFIP Conference on Software Architecture (WICSA), pp. 320-327.*
Cai et al., "Multi-tenant Service Composition Based on Granularity Computing," 2014, IEEE International Conference on Services Computing (SCC), pp. 669-676.*
International Search Report and Written Opinion for International Patent Application No. PCT/US2016/037954, dated Sep. 9, 2016, date of filing: Jun. 17, 2016, 13 pages.
Walraven, Stefan, "Middleware and Methods for Customizable SaaS", Published on: Jun. 2014 Available at: https://lirias.kuleuven.be/bitstream/123456789/455179/1/PhD-Final-WalravenS-2014.pdf.
"2-Hosting a Multi-Tenant Application on Windows Azure", Published on: Dec. 14, 2012 Available at; https://msdn.microsoft.com/en-us/library/hh534478.aspx.
Moens, et al., "Feature-Based Application Development and Management of Multi-Tenant Applications in Clouds", In Proceedings of the 18th International Software Product Line Conference—vol. 1, Sep. 15, 2014, pp. 72-81.
Farber, et al., "An In-Memory Database System for Multi-Tenant Applications", In Proceedings of 14th Conference on the GI department Databases and Information Systems, Mar. 2, 2011, pp. 650-666.
Sood, Rahul, "ERP hosted with a SaaS multi-tenancy environment: Are limitations with tenant-specific customization one of the major factors which may prevent adoption by SMEs?", Retrieved on: May 28, 2015 Available at: http://www.quora.com/ERP-hosted-within-a-SaaS-multi-tenancy-environment-Are-limitations-with-tenant-specific-customization-one-of-the-major-factors-which-may-prevent-adoption-by-SMEs.
Eacrett, Michael, "What is new in SAP HANA SPS 09", Published on: Oct. 21, 2014 Available at: https://blogs.saphana.com/2014/10/21/what-is-new-in-sap-hana-sps-09/.
Kabbedijk, Jaap, "Variability in Multi-Tenant Enterprise Software", In PhD Thesis, Dec. 2014, 274 pages.
Walraven, et al., "Efficient customization of multi-tenant Software-as-a-Service applications with service lines", In Journal of Systems and Software, May 20, 2014, 2 pages.
Blanas, et al.,"Memory Footprint Matters: Efficient Equi-Join Algorithms for Main Memory Data Processing", In Proceedings of ACM Symposium on Cloud Computing, Oct. 1, 2013, 16 pages.
Second Written Opinion for International Patent Application No. PCT/US2016/037954, dated Jun. 1, 2017, date of filing: Jun. 17, 2016, 11 pages.
"International Preliminary Report on Patentability Issued in PCT Application No. PCT/US2016/037954", dated Oct. 20, 2017, 12 Pages.

* cited by examiner

MULTI-TENANT, TENANT-SPECIFIC APPLICATIONS

BACKGROUND

Computer systems are currently in wide use. Some computer systems are used by end user organizations in order to help them perform tasks, activities and other processes that they customarily perform.

Some such computer systems provide a platform upon which various levels of developers generate customizations that ultimately comprise an end user solution. For instance, a computer system manufacturer may manufacture a base computer system. An independent software vendor may generate customizations to the base system and provide it to value added resellers or developers or end user organizations. The value added resellers, developers or end user organizations may make their own customizations to generate a final solution that is ultimately deployed for an end user organization.

This type of customization channel can make multi-tenancy difficult. For instance, each different tenant may represent a separate organization. Each organization may have its own set of customizations that represent its own solution. Thus, it can be difficult to offer any given solution, in multi-tenancy, because each tenant may have its own specific customizations to the base system.

The discussion above is merely provided for general background information and is not intended to be used as an aid in determining the scope of the claimed subject matter.

SUMMARY

Customizations, made at various levels in the customization channel, are saved as separate sets of customization deltas and can be applied to a base computing system in order to generate a customized solution. In a multi-tenant environment, groups of tenants can share common resources (like the application, metadata, and caching of common data), but access different customization deltas. The tenants that use customization deltas are automatically grouped, based upon the customization deltas that they access, and the deltas for those customizations are applied to the base system at runtime, for each group.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
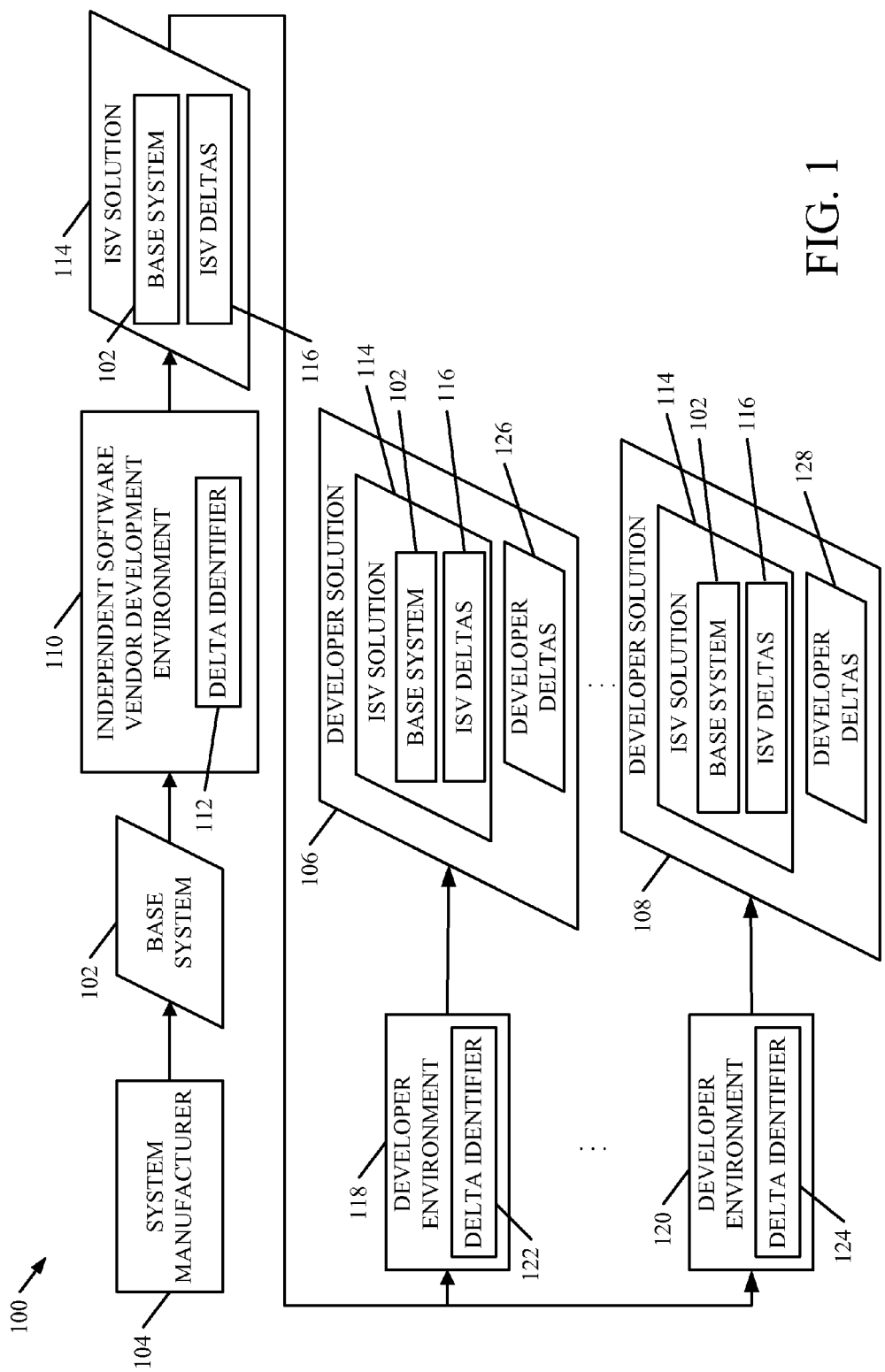
FIG. 1 is a block diagram of one example of a customization channel.
Figure 2:
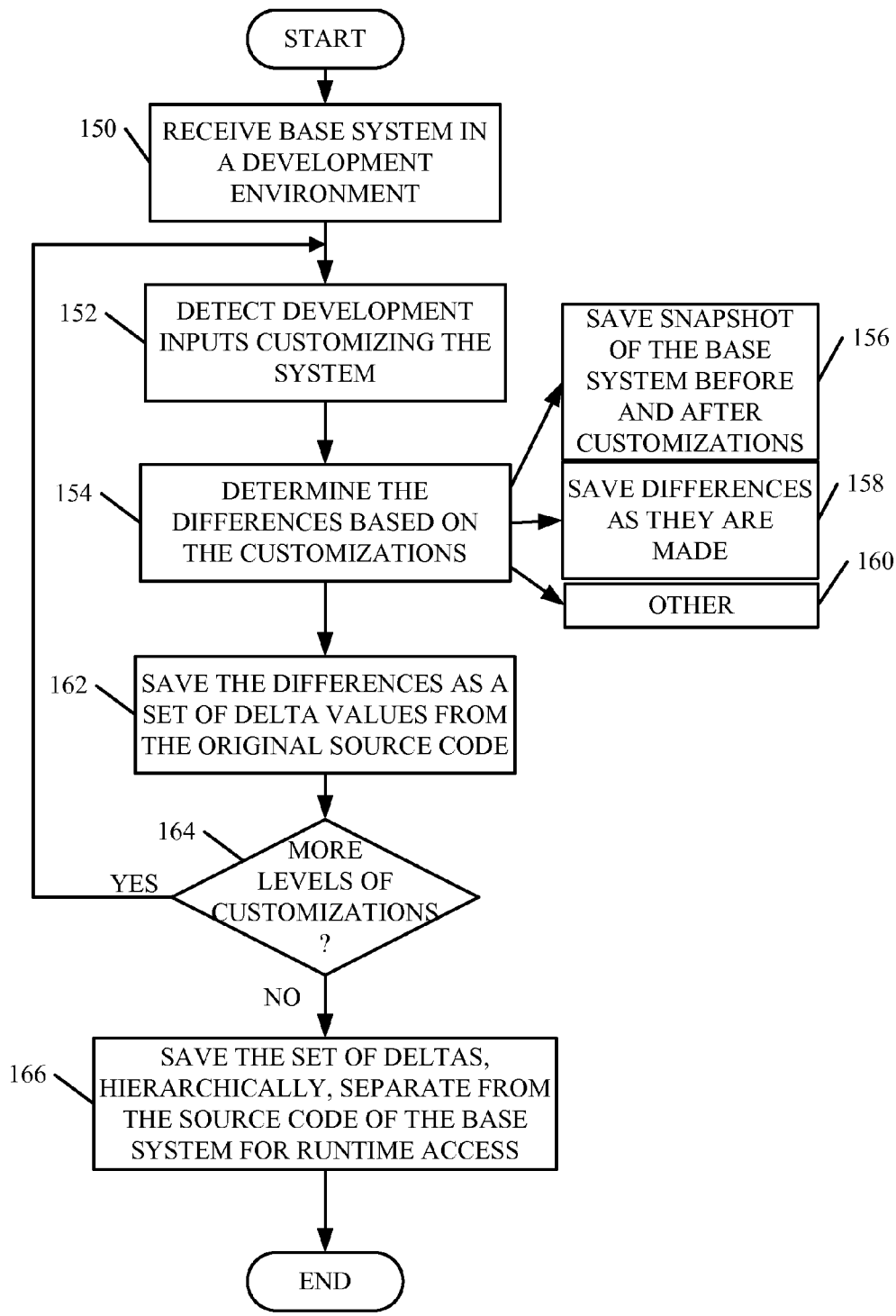
FIG. 2 is a flow diagram illustrating one example of the operation of the development environments in FIG. 1 in saving customization deltas separately, from a base system.
Figure 3:
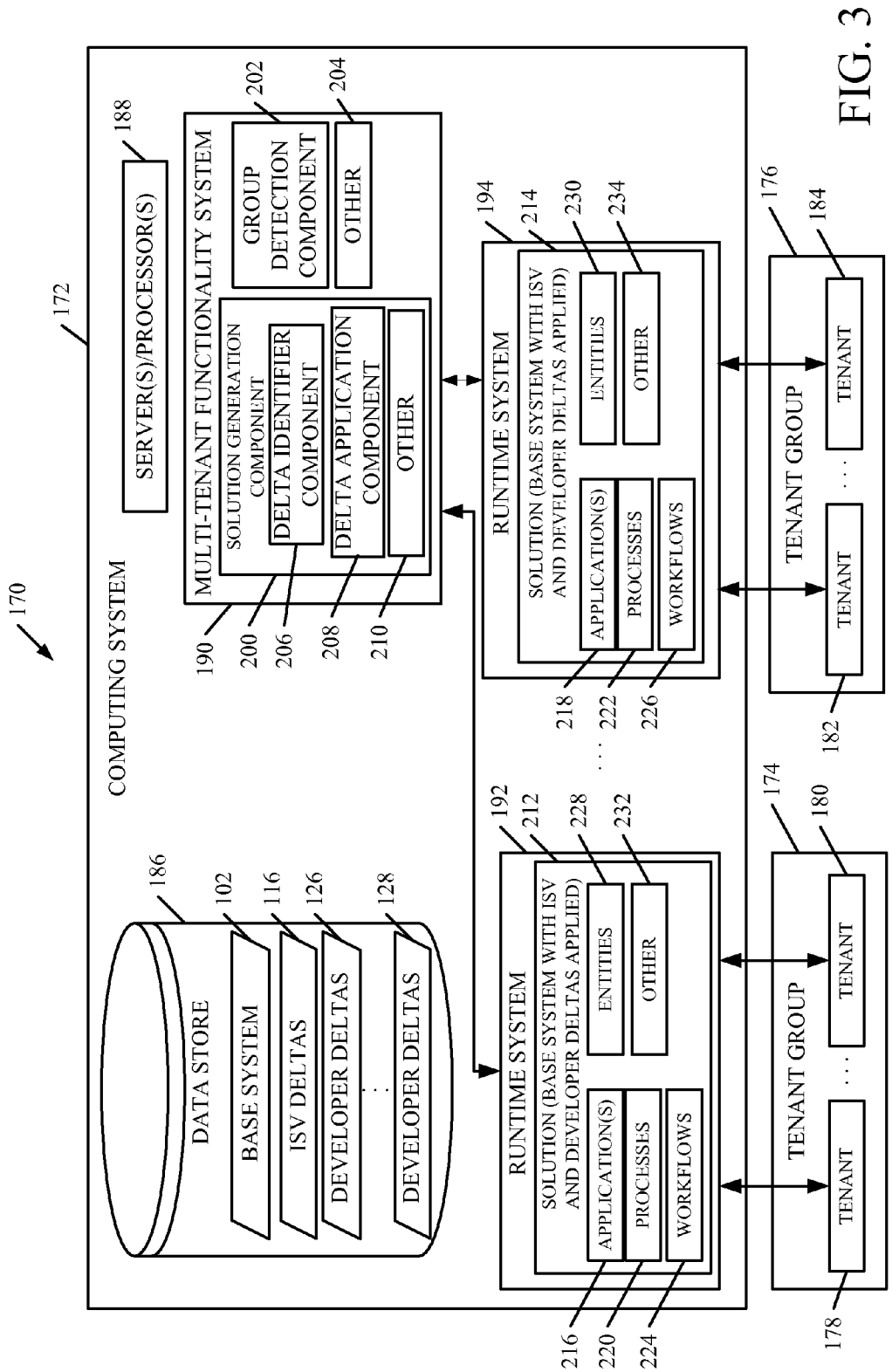
FIG. 3 is a block diagram of one example of a computing system architecture.
Figure 4:
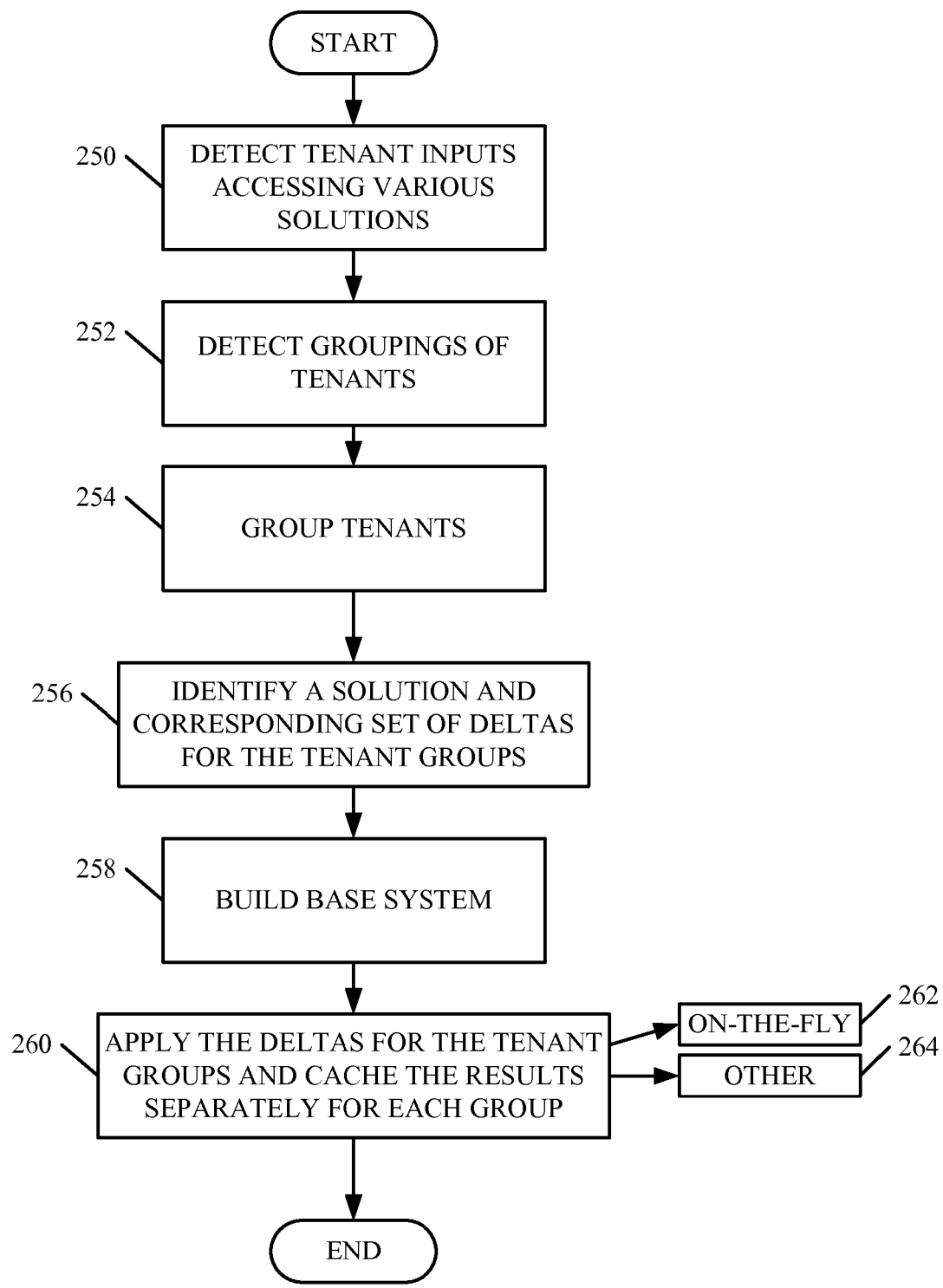
FIG. 4 is a flow diagram illustrating one example of the operation of multi-tenant functionality in the architecture shown in FIG. 1.

In the present description, FIGS. 1 and 2 will describe how customization deltas are generated in one example of a customization channel FIGS. 3 and 4 will describe how the deltas are applied in a runtime environment. The customization channel and runtime environment are examples only.

FIG. 1 is a block diagram of one example of a customization channel 100 in which a base computer system 102, that is manufactured by a system manufacturer 104, is customized into a set of end user solutions 106 and 108 that can be deployed at end user organizations. Base system 102 can be comprised of a wide variety of different types of systems. It can be an enterprise system or another system. In one example, for instance, it can be a document management system, an electronic mail system, an enterprise resource planning system, a customer relations management system, or a wide variety of other systems.

In one example, base system 102 is a metadata driven system. Thus, the various forms, functions, data records (or entities), etc. are defined by metadata. The particular way that functionality in base system 102 is accessed and configured can be developed by a developer. A developer may generate deltas by generating customized metadata that is applied on top of the base system. For example, if a given form in the base system is a customer form that has two address fields, a developer may add a third address field by adding additional metadata to that form. However, the form, as identified by the base system metadata, will be stored separately from the delta metadata that adds the additional field. This is only one example of how a customization delta maybe used, and there are many others.

By way of overview, in one example, base system 102 is received at an independent software vendor (ISV) development environment 110. Development environment 110 illustratively includes development functionality that allows independent software vendors to develop on base system 102. In doing so, they illustratively generate changes or customizations to base system 102. Delta identifier 112 illustratively identifies the changes from the base system 102 and development environment 110 thus outputs an ISV solution 114 that includes base system 102, and the separately saved ISV deltas 116 that are identified by delta identifier 112.

The ISV solution 114 can also be provided to multiple different developer environments 118-120. Each of these environments illustratively has development functionality so that developers can develop on, or otherwise customize, ISV solution 114.

Each of the environments 118-120 illustratively includes a delta identifier 122-124, that identifies the changes that each of the developers (using the corresponding development environments 118-120) makes to ISV solution 114. Those changes are illustratively saved separately, as developer deltas. Thus, the output of development environment 118 is illustratively a developer solution 106 which includes the ISV solution 114 that, itself, includes base system 102 and separately saved ISV deltas 116. Developer deltas 126, that are identified by delta identifier 122 are also saved separately from ISV solution 114, as part of developer solution 106.

Similarly, the output of environment 120 is illustratively developer solution 108. Developer solution 108 includes ISV solution 114 that has base system 102, with separately saved ISV deltas 116, and separately saved developer deltas 128, that were identified by delta identifier 124 as developer-generated customizations using development environment 120.

As is described in greater detail below, because the base system 102 is separately saved (separately from the various customizations made at the different levels in the customization channel 100), individual tenants in a multi-tenant system can use individual solutions (or customization deltas), while sharing common functionality of base system 102, ISV solution 114, etc. As is discussed below, this enhances scalability in multi-tenancy, ease of applying updates and maintenance, among other things.

FIG. 2 is a flow diagram illustrating one example of the operation of the customization architecture 100, shown in FIG. 1. The base system 102 is first received in a development environment. This is indicated by block 150 in FIG. 2. In the example shown in FIG. 1, base system 102 is first received by ISV development environment 110, although this is an example only, and it could be received by many different development environments.

Delta identifier 112 then detects development inputs customizing base system 102. This is indicated by block 152. It then determines the differences between base system 102 before the customizations, and after the customizations are made. This is indicated by block 154. In one example, it illustratively takes a snapshot of base system 102, (or saves the various metadata values and other values in base system 102) before customizations, and then does the same after the customizations are applied. It then identifies the differences between the two systems and saves them as ISV deltas 116. Saving a snapshot of the base system 102 before and after the customizations to identify the deltas is indicated by block 156. In another example, the deltas (or customizations) can be saved as they are made. This is indicated by block 158. The ISV deltas can be identified in other ways as well, and this is indicated by block 160.

The differences introduced by the customizations in ISV development environment 110 are saved as ISV deltas 116, separately from the base system 102. This is indicated by block 162.

If there are more levels of customization, then the process repeats itself. That is, if the ISV solution (which stores base system 102 and ISV deltas 116, separately) is provided to any other developer environments 118 and 120, then processing reverts back to block 152 where the customization inputs in those development environments are detected and the differences (or customization deltas) are identified and saved separately from not only the source code of base system 110, but also separately from ISV deltas 116. Reverting to block 152 to perform these operations is indicated by block 164 in FIG. 2.

When no more customizations are to be performed, the output is a saved solution which saves the sets of customization deltas, hierarchically, to indicate where, in the customization channel 100, they were made. Each set of deltas is also saved separately from the source code of base system 102. They are saved as deltas that are to be applied in a given solution. The solution is then saved for runtime access by a runtime system. This is indicated by block 166.

FIG. 3 is a block diagram of one example computing system architecture 170. Architecture 170 illustratively includes computing system 172 that is accessed by a set of tenant groups 174-176. Tenant group 174 illustratively includes tenants 178-180. Tenant group 176 illustratively includes tenants 182-184. Each of the tenant groups 174-176 illustratively accesses a solution (or a common set of customization deltas) that is run by computing system 172. Thus, computing system 172 illustratively provides multi-tenant access to a set of solutions that are all generated from base system 102.

It will also be noted that multi-tenancy can be provided at multiple different levels, and not just the end user solution. For instance, if a group of tenants accesses a common set of ISV deltas, then those tenants can be grouped and served from the same cache with respect to those ISV deltas, while they are not grouped with respect to a further set of developer customization deltas. All of these scenarios are contemplated herein. Thus, while the present description proceeds with respect to grouping tenants who access the same end user solutions, that is only one example of multi-tenancy.

Continuing with the description of FIG. 3, computing system 172 illustratively includes data store 186, a set of processors or servers 188, multi-tenant functionality system 190 that provides functionality for performing multi-tenant operations, and a set of runtime systems 192-194 that perform runtime operations to provide tenant groups with access to runtime solutions. In the example shown in FIG. 3, data store 186 illustratively includes base system 102 that is stored separately from ISV deltas 116, and the various developer deltas 126-128 that are generated in the various developer environments 118-120. Multi-tenant functionality system 190 illustratively includes a solution generation component 200, a group detection component 202, and it can include other items 204. Solution generation component 200 illustratively includes delta identifier component 206 and delta application component 208, and it can include other items 210.

Runtime systems 192-194 each run a solution 212-214. Each solution illustratively includes a set of applications 216-218, processes 220-222, workflows 224-226, entities 228-230, and they can include other items 232-234. The runtime system 192 illustratively runs applications 216. In doing so, it can perform processes 220 or workflows 224. It can also operate on entities 228 or any other data records in solution 212. The same type of operations can occur in runtime system 194, except that it runs a different customized version of base system 102, based on a different set of customization deltas.

Delta identifier component 206 in solution generation component 200 identifies the particular set or sets of deltas that are to be applied to a base system, for each of the solutions 212 and 214. For instance, if a group of tenants 174 has subscribed or has otherwise indicated that they are using a given solution 212, then delta identifier component 206 identifies the set of hierarchically arranged deltas that are applied to generate solution 212. Delta application component 208 then applies those deltas to the base system in order to generate solution 212, for runtime system 192.

Group detection component 202 can automatically identify whether different tenants are accessing the same solution. If so, they are grouped so that the multi-tenancy operations can be performed efficiently. For instance, the multi-tenant solutions can be cached together for a group of tenants that is accessing the same solution (or the same set or subset of customization deltas at any level or levels in the hierarchy of deltas).

FIG. 4 is a flow diagram illustrating one example of the operation of architecture 170, shown in FIG. 3. Multi-tenant functionality system 190 first detects one or more tenant inputs accessing a various solution (or set of customization deltas) in computing system 172. This is indicated by block 250 in FIG. 4.

Group detection component 202 detects groupings of tenants, as indicated by block 206. For instance, the individual tenants may subscribe or otherwise indicate a particular solution (or set of customization deltas) that they wish to access through multi-tenant functionality system 192. In another example, component 202 may illustratively monitor the operations of each of the tenants in accessing solutions. Thus, component 202 can automatically identify tenants that are accessing the same solutions (or a same set of customization deltas). In any case, component 202 illustratively identifies groupings of tenants that are accessing the same functionality, or the same solutions, that are generated based upon the same sets of deltas. It then groups those tenants into groups (such as groups 174-176). This is indicated by block 254 in FIG. 4.

Solution generation component 200 then identifies a solution and corresponding set of deltas for the tenant groups. For instance, if one tenant or tenant group is accessing a solution that has base system 102 that is customized by ISV deltas 116 and developer deltas 126, then this is identified by solution generation component 200. On the other hand, if it identifies that a tenant or tenant group is accessing base system 102 customized by ISV deltas 116 and developer deltas 128, then it identifies the tenant or tenant group as accessing a separate solution. Identifying a solution and the set of deltas for the tenant groups is indicated by block 256 in FIG. 4.

Solution generation component 200 then builds the base system 102 and applies the deltas for the tenant groups. In doing so, it caches the results separately for each group. Thus, it can cache solution 212 (base system 102 with deltas 116 and 126 applied) separately from solution 214 (i.e., which will cache base system 102 with deltas 116 and 128 applied). Building the base system and applying the deltas for the tenant groups, and caching the runtime results separately for each group, is indicated by block 258 and 260, respectively.

It should be noted that, in one example, delta application component 208 applies the deltas for an entire solution as soon as a given tenant accesses that solution. In another example, it can apply the deltas for a given solution on-the-fly, as the various tenants that are accessing that solution need those components of the solution. Applying the deltas on-the-fly is indicated by block 262. The deltas can of course be applied in other ways as well, and this is indicated by block 264.

This system advantageously provides a cost effective hosting mechanism which can require reduced hardware and easier management and maintenance operations. These solutions can be much easier to update and thus provide lower cost of ownership. Storing cross-tenant metadata (e.g., caching solutions for common usage by tenants) can increase the efficiency of memory utilization as well.

Further, because the base system is stored separately from the hierarchically arranged deltas, updates can be made much more easily. For instance, when the base system manufacturer (or any developer of any component of a solution) generates an update, the updates can be up-taken much more easily because they can be made to that particular component without any customizations applied. This is much easier than trying to make an update to a component where the deltas are applied to the component and the solution is stored in that form.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
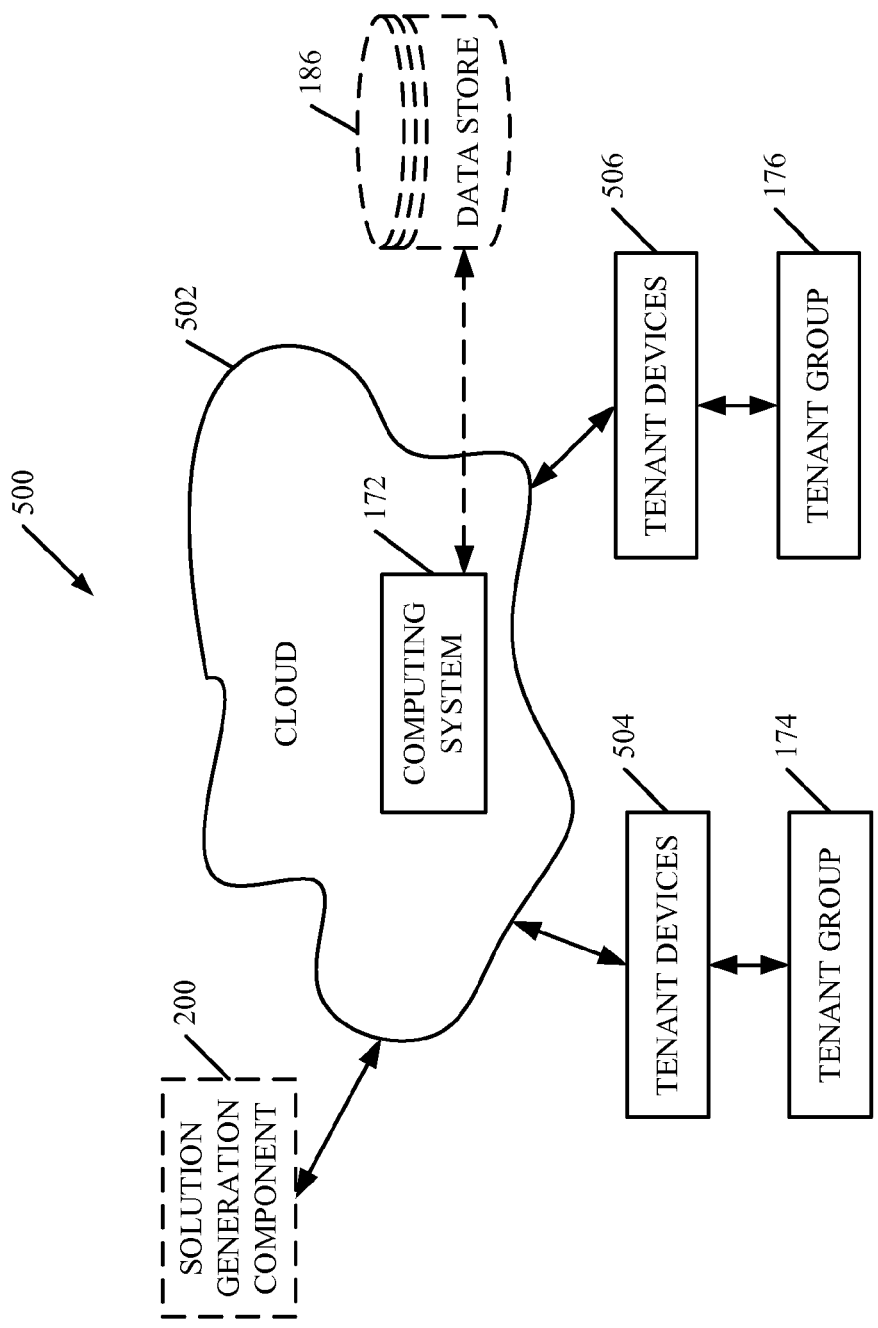
FIG. 5 is a block diagram of one example of the architecture shown in FIG. 3, deployed in a cloud computing architecture.

FIG. 5 is a block diagram of architecture 170, shown in FIG. 3, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that multi-tenant data center (e.g., computing system 172) is located in cloud 502 (which can be public, private, or a combination where portions are public while others are private). Therefore, tenant groups 174-176 use tenant devices 504-506 to access those systems through cloud 502.

FIG. 5 also depicts another example of a cloud architecture. FIG. 5 shows that it is also contemplated that some elements of data center 172 can be disposed in cloud 502 while others are not. By way of example, data store 186 can be disposed outside of cloud 502, and accessed through cloud 502. In another example, solution generation component 200 can also be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 170, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
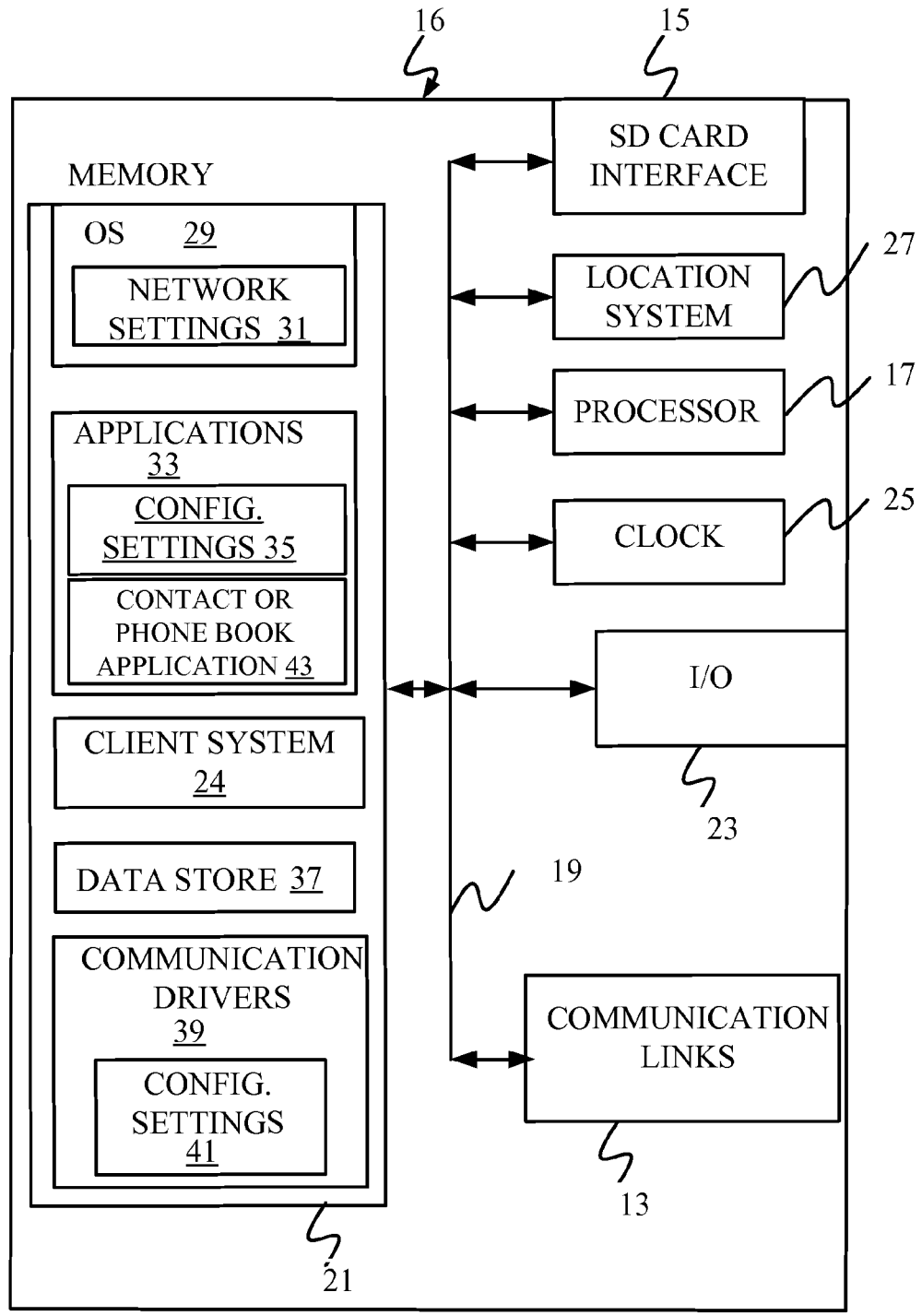
FIGS. 6-8 show block diagrams of various examples of mobile devices that can be used in the architectures shown in the previous figures.
Figure 7:
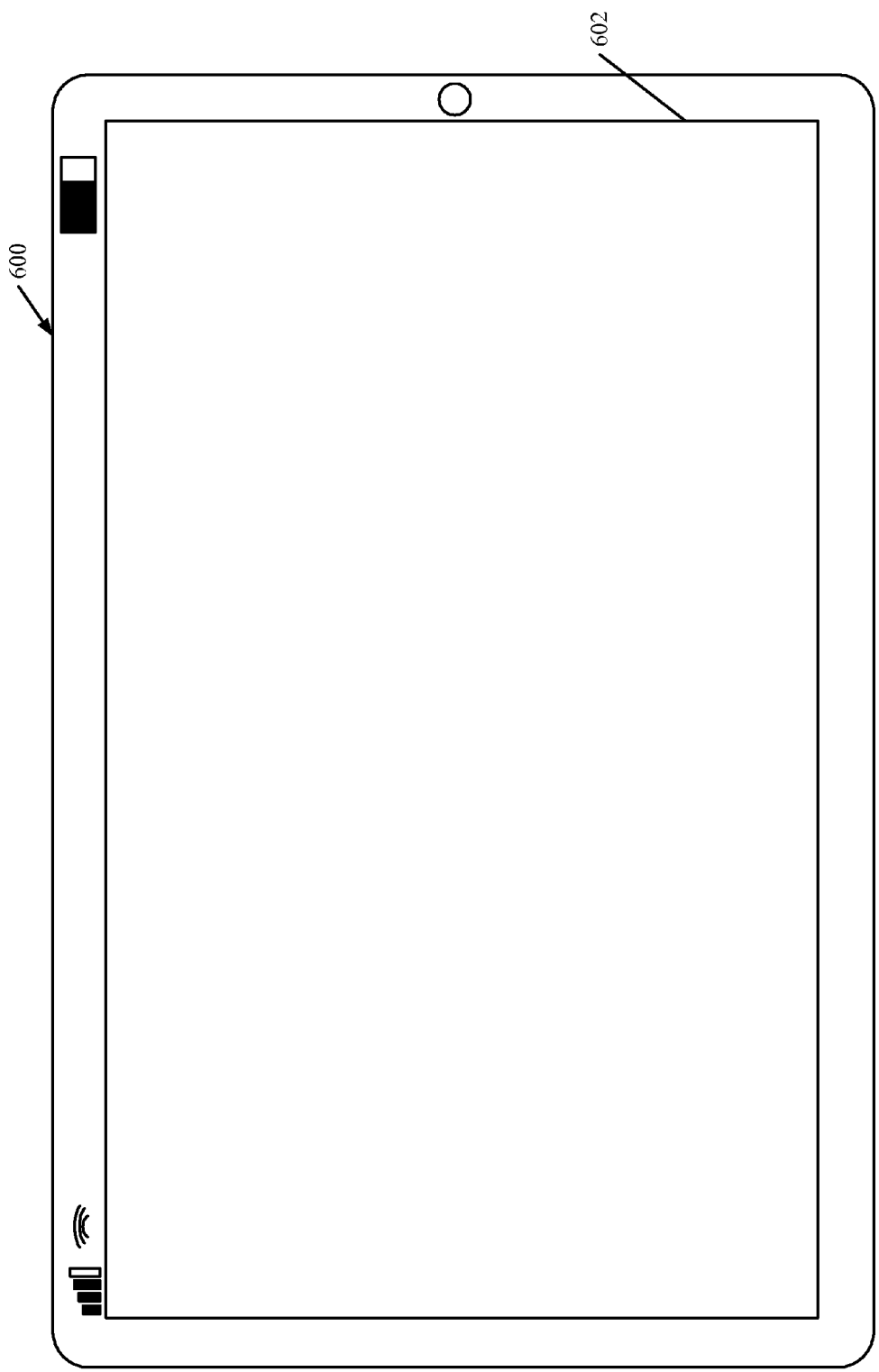
Figure 8:
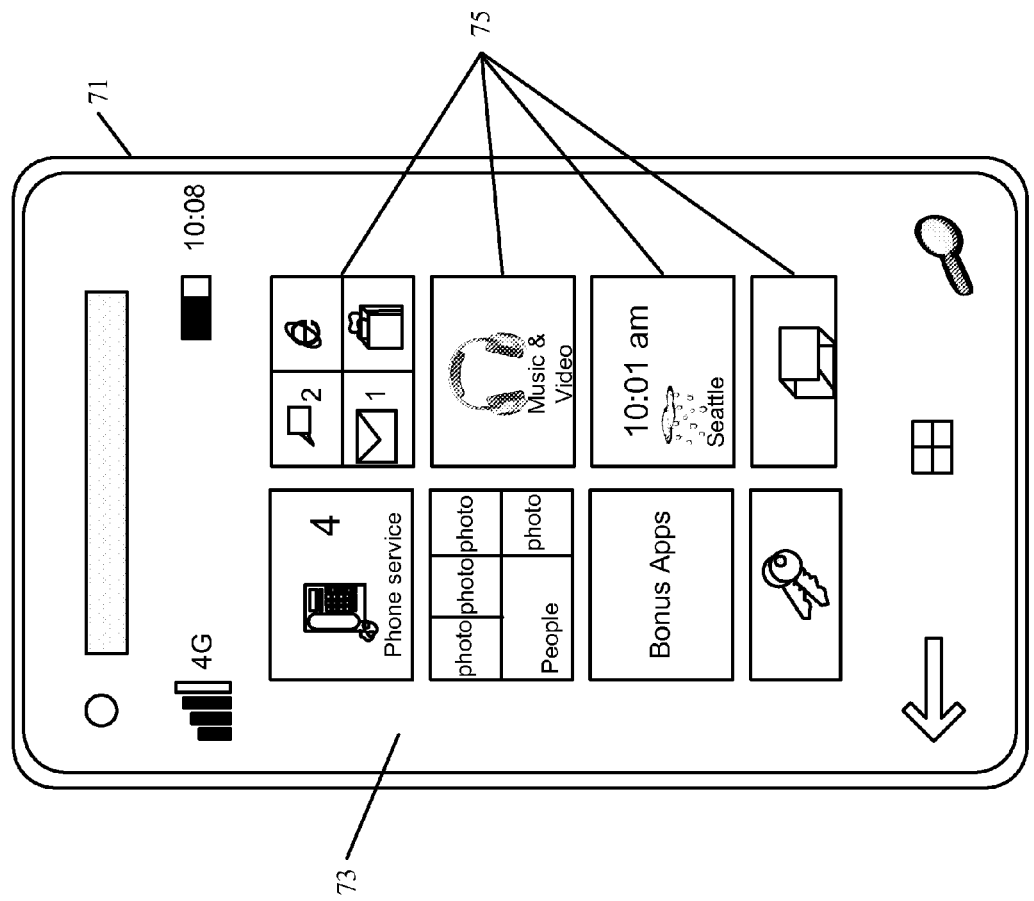

FIG. 6 is a simplified block diagram of one illustrative embodiment of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of data center 172 or tenant groups 174-176 that interacts with architecture 170, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 188 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of tenants in groups 174-176. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
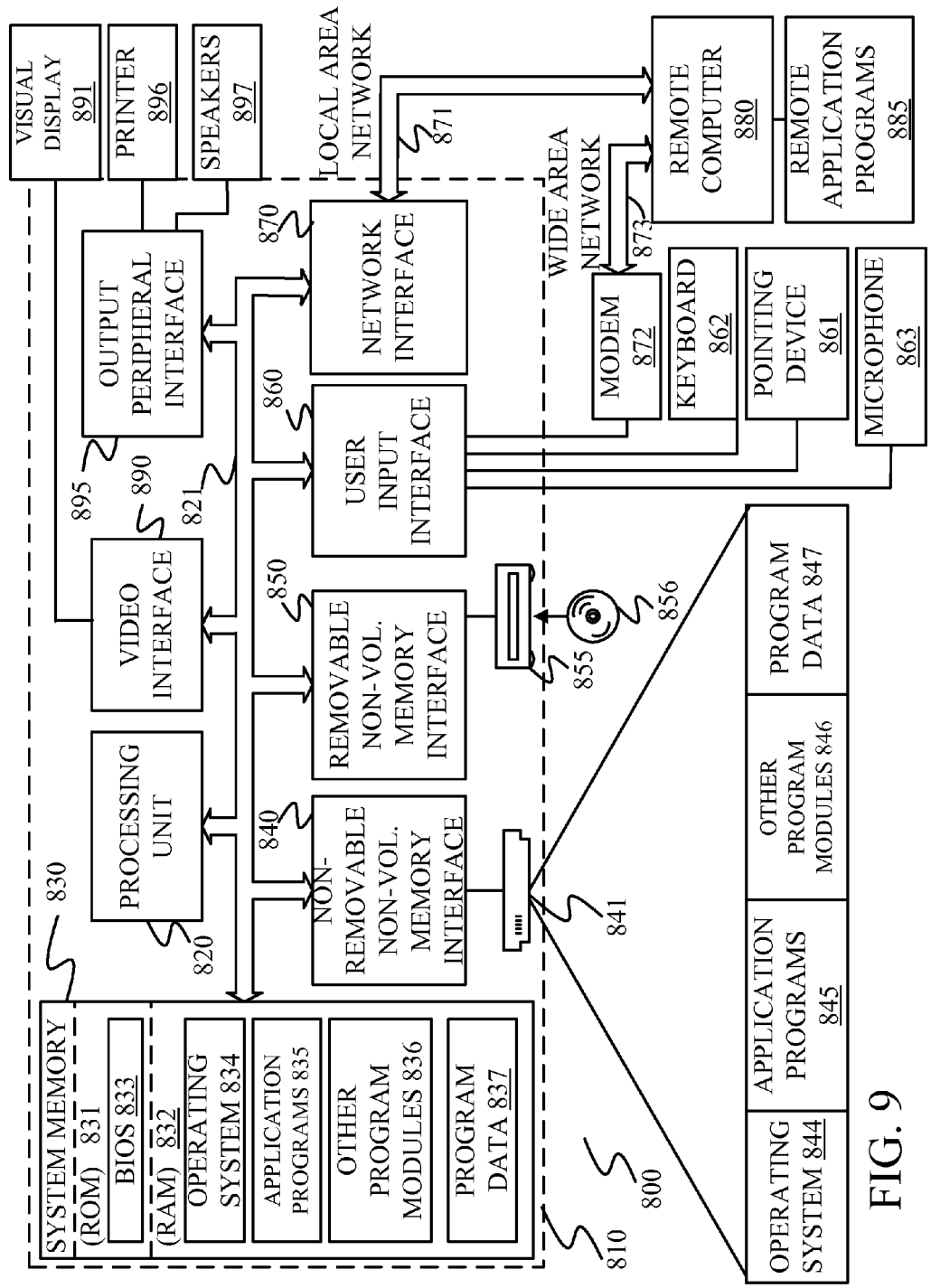
FIG. 9 is a block diagram of one example of a computing environment that can be used in the architectures shown in the previous figures.

FIG. 9 is one example of a computing environment in which architecture 170, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor 188), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a multi-tenant computing system, comprising:

a delta identifier component that detects a tenant input accessing a given solution and identifies a hierarchical set of customization deltas, arranged according to a customization hierarchy, that represent customizations to a base system, corresponding to the given solution; and a delta application component that applies the identified set of hierarchical customization deltas to the base system, in an order identified by the hierarchy, to provide the tenant with runtime access to the given solution.

Example 2 is the computing system of any or all previous examples and further comprising:

a group detection component that detects different tenants accessing a common set of customization deltas in the hierarchical set of customization deltas and groups the different tenants into a tenant group.

of any or all previous examples The computing system of any or all previous examples and further comprising:

a multi-tenant functionality system that performs multi-tenant processing, for the group of tenants, the multi-tenant functionality system treating the group of tenants as a single tenant with respect to the common set of customization deltas.

Example 4 is the computing system of any or all previous examples wherein the group detection component detects the different tenants accessing the common set of customization deltas by detecting that the different tenants are all accessing a common solution.

Example 5 is the computing system of any or all previous examples wherein the group detection component detects the different tenants accessing the common set of customization deltas by detecting that the different tenants are all accessing a common set of customization deltas at a same level in the customization hierarchy.

Example 6 is the computing system of any or all previous examples wherein the delta application component applies the identified set of hierarchical customization deltas as they are requested by the tenant, during runtime.

Example 7 is the computing system of any or all previous examples and further comprising:

a developer environment that includes development functionality for detecting customization inputs and generating customizations relative to the base system, based on the customization inputs.

Example 8 is the computing system of any or all previous examples wherein the development environment comprises:

a delta generator that detects differences between the base system before the customizations are applied and after the customizations are applied and generates customization deltas representing the detected differences.

Example 9 is a computer implemented method, comprising:

detecting a tenant input accessing a given solution in a multi-tenant system;

identifying a hierarchical set of customization deltas, arranged according to a customization hierarchy, that represent customizations to a base system, corresponding to the given solution;

applying the identified set of hierarchical customization deltas to the base system, in an order identified by the hierarchy; and providing the base system, with the identified set of hierarchical customization deltas applied, to a tenant runtime system for runtime access to the given solution.

Example 10 is the computer implemented method of any or all previous examples and further comprising:

detecting a first plurality of different tenants accessing a first common set of customization deltas in the hierarchical set of customization deltas; and grouping the first plurality of different tenants into a first tenant group.

Example 11 is the computer implemented method of any or all previous examples and further comprising:

detecting a second plurality of different tenants accessing a second common set of customization deltas in the hierarchical set of customization deltas; and grouping the second plurality of different tenants into a second tenant group.

Example 12 is the computer implemented method of any or all previous examples and further comprising:

performing multi-tenant processing, for the first and second groups of tenants, treating the first group of tenants as a first tenant with respect to the first common set of customization deltas, and treating the second group of tenants as a second tenant with respect to the second common set of customization deltas.

Example 13 is the computer implemented method of any or all previous examples wherein detecting the first plurality of different tenants accessing the first common set of customization deltas comprises:

detecting that the first plurality of different tenants are all accessing a common solution.

Example 14 is the computer implemented method of any or all previous examples wherein detecting the first plurality of different tenants accessing the first common set of customization deltas comprises:

detecting that the first plurality of different tenants are all accessing the common set of customization deltas at a same level in the customization hierarchy.

Example 15 is the computer implemented method of any or all previous examples wherein applying the identified set of hierarchical customization deltas is performed, as they are requested by the tenant, during runtime.

Example 16 is the computer implemented method of any or all previous examples and further comprising:

detecting customization inputs in a development environment;

generating customizations relative to the base system, based on the customization inputs;

detecting differences between the base system before the customizations are applied and after the customizations are applied; and generating customization deltas representing the detected differences.

Example 17 is the computer implemented method of any or all previous examples and further comprising:

generating the set of hierarchical customization deltas based on a level in a customization channel at which the customization deltas were generated.

Example 18 is the computer implemented method of any or all previous examples wherein generating the set of hierarchical customization deltas comprises:

detecting the level in the customization channel at which the customization deltas were generated; and assigning the customization deltas to a level in the customization hierarchy based on the level in the customization channel.

Example 19 is a computing system, comprising:

a delta identifier component that detects a tenant input accessing a given solution and identifies a hierarchical set of customization deltas, arranged according to a customization hierarchy, that represent customizations to a base system, corresponding to the given solution;

a delta application component that applies the identified set of hierarchical customization deltas to the base system, in an order identified by the hierarchy, to provide the tenant with runtime access to the given solution;

a group detection component that detects different tenants accessing a common set of customization deltas in the hierarchical set of customization deltas and groups the different tenants into a tenant group; and a multi-tenant functionality system that performs multi-tenant processing, for the group of tenants, the multi-tenant functionality system treating the group of tenants as a single tenant with respect to the common set of customization deltas.

Example 20 is the computing system of any or all previous examples and further comprising:

a developer environment that includes development functionality for detecting customization inputs and generating customizations relative to the base system, based on the customization inputs; and a delta generator that detects differences between the base system before the customizations are applied and after the customizations are applied and generates customization deltas representing the detected differences.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A multi-tenant computing system, comprising:
a processor; and
memory storing instructions executable by the processor, wherein the instructions, when executed, configure the multi-tenant computing system to provide:
a delta identifier component configured to:
detect a tenant input associated with a tenant;
based on the tenant input, identify a given computing solution;
identify a plurality of customization deltas corresponding to the given computing solution, each customization delta comprising delta metadata that
is stored separate from the other customization deltas and from base system metadata that defines a base computing system, and
represents a different customization to the base system metadata to generate computing functionality of the given computing solution; and
identify a customization hierarchy that is associated with the plurality of customization deltas and defines hierarchical relationships between customization deltas in the plurality of customization deltas; and
a delta application component configured to:
based on the hierarchical relationships, determine an order of application of the plurality of customization deltas; and
generate a runtime computing system configured to provide the tenant with runtime access to the given computing solution, wherein the runtime computing system is generated by
applying, to the base system metadata, the delta metadata from each of the plurality of customization deltas in accordance with the determined order.

2. The computing system of claim 1, wherein the instructions, when executed, configure the multi-tenant computing system to provide:
a group detection component configured to:
detect different tenants accessing a common set of customization deltas; and
group the different tenants into a single tenant group.

3. The computing system of claim 2 wherein the instructions, when executed, configure the multi-tenant computing system to provide:

a multi-tenant functionality system configured to:
apply the common set of customization deltas to the base computing system based on the determined order to generate a runtime computing system having a set of resources configured to run the common computing solution; and
provide each tenant, in the single tenant group, with runtime access to the same set of resources in the runtime computing system.

4. The computing system of claim 3 wherein the group detection component is configured to:
detect the different tenants accessing the common set of customization deltas by determining that each of the different tenants is requesting access to a same set of functionality.

5. The computing system of claim 3 wherein the customization hierarchy associates each customization delta with a corresponding hierarchy level, and wherein the group detection component is configured to:
determine that each customization delta in the common set of customization deltas is assigned to a same hierarchy level in the customization hierarchy.

6. The computing system of claim 1 wherein the delta application component is configured to:
during runtime,
receive requests for computing functionality associated with the common set of customization deltas; and
apply, to the base computing system, each respective customization delta in the common set in response to the request for the computing functionality associated with the respective customization delta.

7. The computing system of claim 1 wherein the instructions, when executed, configure the multi-tenant computing system to provide:
a developer environment that includes development functionality configured to detect an indication of a customization input and generate a customization relative to the base system, based on the indication of the customization input.

8. The computing system of claim 7 wherein the development environment comprises:
a delta generator configured to detect a different between the base system before the customization is applied and after the customization is applied, and generate a customization delta representing the detected difference.

9. A computer implemented method, comprising:
determining that requests by a plurality of different tenants correspond to a common computing solution having a common set of customization deltas, each customization delta comprising delta metadata that is stored separate from other customization deltas and from base system metadata that defines a base computing system, and that represents a different customization to the base computing system metadata to generate computing functionality of the computing solution;
based on the determination, grouping the plurality of different tenants into a tenant group;
identifying a customization hierarchy that is associated with the common set of customization deltas and defines hierarchical relationships between customization deltas in the common set of customization deltas;
based on the hierarchical relationships, determining an order of application of the common set of customization deltas;
applying the common set of customization deltas to the base computing system based on the determined order to generate a runtime computing system having a set of resources configured to run the common computing solution by applying, to the base system metadata, the delta metadata from each of the common set of customization deltas in accordance with the determined order; and
providing each tenant, of the plurality of different tenants in the tenant group, with runtime access to the same set of resources configured to run the common computing solution in the runtime computing system.

10. The computer implemented method of claim 9, wherein
the plurality of different tenants comprises a first plurality of different tenants accessing a first common set of customization deltas in the hierarchical set of customization deltas,
grouping the plurality of different tenants comprises grouping the first plurality of different tenants into a first tenant group, and
the common computing solution comprises a first common co siting solution.

11. The computer implemented method of claim 10 and further comprising:
detecting inputs associated with the plurality of different tenants, the inputs being indicative of requests by the plurality of different tenants to access a multi-tenant computing system;
detecting inputs associated with a second plurality of different tenants, the inputs being indicative of requests by the second plurality of different tenants to access the multi-tenant computing system;
determining that the requests by the second plurality of different tenants correspond to a second common computing solution having a second common set of customization deltas; and
grouping the second plurality of different tenants into a second tenant group.

12. The computer implemented method of claim 11 and further comprising:
performing multi-tenant processing, for the first and second groups of tenants, treating the first group of tenants as a first tenant with respect to the first common set of customization deltas, and treating the second group of tenants as a second tenant with respect to the second common set of customization deltas,
wherein each tenant, of the second plurality of different tenants, is provided with runtime access to a same set of resources configured to run the second common computing solution in the runtime computing system.

13. The computer implemented method of claim 10 wherein the customization hierarchy associates each customization delta with a corresponding hierarchy level, and wherein determining that the requests by the plurality of different tenants correspond to a common computing solution comprises:
determining that each customization delta in the common set of customization deltas is assigned to at a same hierarchy level in the customization hierarchy.

14. The computer implemented method of claim 9 wherein applying the common set of customization deltas comprises:
during runtime,
receiving requests for computing functionality associated with the common set of customization deltas; and applying each respective customization delta in the common set in response to the request for the computing functionality associated with the respective customization delta.

15. The computer implemented method of claim 9 and further comprising:
    detecting an indication of a customization input in a development environment;
    generating a customization relative to the base computing system, based on the indication of the customization input;
    detecting a difference between the base computing system before the customization is applied and after the customization is applied; and
    generating customization delta representing the detected difference.

16. The computer implemented method of claim 9 and further comprising:
    generating the customization hierarchy based on a level in a customization channel at which each the customization deltas was generated.

17. The computer implemented method of claim 16 wherein generating the customization hierarchy comprises:
    detecting the level in the customization channel at which each of the customization deltas was generated; and
    assigning each of the customization deltas to a level in the customization hierarchy based on the level in the customization channel.

18. A computing system, comprising:
    at least one processor; and
    memory storing instructions executable by the at least one processor, wherein the instructions, when executed, configure the computing system to provide:
    a delta identifier component configured to:
        determine that requests by a plurality of different tenants correspond to a common computing solution having a common set of customization deltas, each customization delta comprising delta metadata that is stored separate from other customization deltas and from base computing system metadata that defines a base computing system, and that represents a different customization to the base computing system metadata to generate computing functionality of the common computing solution; and
        identify a customization hierarchy that is associated with the common set of customization deltas and defines hierarchical relationships between customization deltas in the common set of customization deltas;
    a delta application component configured to:
        based on the hierarchical relationships, determine an order of application of the plurality of customization deltas; and
        apply the common set of customization deltas to the base computing system based on the determined order to generate a runtime computing system having a set of resources configured to run the common computing solution by applying, to the base system metadata, the delta metadata from each of the common set of customization deltas in accordance with the determined order;
    a group detection component configured to:
        based on the determination that the requests by the plurality of different tenants correspond to a common computing solution, group the plurality of different tenants into a tenant group; and
    a multi-tenant functionality system configured to:
        perform multi-tenant processing, for the group of tenants by providing each tenant, in the tenant group, with runtime access to the same set of resources configured to run the common computing solution in the runtime computing system.

19. The computing system of claim 18, wherein the instructions configure the computing system to provide:
    a developer environment that includes development functionality configured to detect customization inputs and generate customizations relative to the base system, based on the customization inputs; and
    a delta generator configured to detect differences between the base system before the customizations are applied and after the customizations are applied and generate customization deltas representing the detected differences.

* * * * *